United States Patent [19]

Nagata et al.

[11] Patent Number: 4,853,263

[45] Date of Patent: Aug. 1, 1989

[54] MOLDING WITH FITTING AND RETAINER MEANS

[75] Inventors: Takuji Nagata; Yasuhisa Kuzuya, both of Aichi, Japan

[73] Assignee: Toyoda Gosei Co., Ltd., Nishikasugai, Japan

[21] Appl. No.: 182,464

[22] Filed: Apr. 18, 1988

[51] Int. Cl.$^4$ .............................................. B60R 13/04
[52] U.S. Cl. ..................... 428/31; 293/128; 428/33; 428/100
[58] Field of Search .............. 428/31, 33, 99, 100; 293/128

[56] References Cited

U.S. PATENT DOCUMENTS

| | | | |
|---|---|---|---|
| 3,606,433 | 9/1971 | Kunevicius | 428/31 X |
| 3,811,989 | 5/1974 | Hearn | 428/31 X |
| 4,066,285 | 1/1978 | Hall et al. | 428/31 X |
| 4,592,937 | 6/1986 | Nagata et al. | 428/31 |
| 4,603,068 | 7/1986 | Hunter | 428/54 |
| 4,704,313 | 11/1987 | Maier | 428/33 |
| 4,748,062 | 5/1988 | Menjo et al. | 428/31 X |

FOREIGN PATENT DOCUMENTS

| | | | |
|---|---|---|---|
| 0040409 | 11/1981 | European Pat. Off. | 428/33 |
| 58-27845 | 6/1983 | Japan | 428/31 |
| 331393 | 8/1958 | Switzerland | 428/31 |

*Primary Examiner*—Henry F. Epstein
*Attorney, Agent, or Firm*—Cushman, Darby & Cushman

[57] ABSTRACT

A molding is disclosed which is constituted by a main molding body formed in an elongated plate-like shape made of soft resin and having a fitting hole passing therethrough in the thickness direction thereof. The molding further has a retainer which is inserted into the fitting hole from the reverse side of the main molding body and a fitting part made of a hard resin which is inserted into the fitting hole from the obverse side of the main molding body, wherein the fitting part is mechanically secured to the retainer to allow the fitting part to be secured to the main molding body. The fitting part has a first seating surface which abuts against the obverse side of the main molding body, and the retainer has a second seating surface which abuts against the reverse side of the main molding body, wherein the main molding body is held and pressed between the first seating surface and the second seating surface.

5 Claims, 1 Drawing Sheet

4,853,263

MOLDING WITH FITTING AND RETAINER MEANS

FIELD OF THE INVENTION

This invention relates to a molding, for an automobile, to which fitted is a part such as a decorative part or a flasher lens (the part will be referred to as "garnish" hereinafter).

BACKGROUND OF THE INVENTION

A molding having garnish in part thereof has been known. For example, a side molding is known which has air outlet apertures for the purpose of preventing any rise in the internal pressure in the vehicle compartment when a door of the vehicle is closed. A side molding of this type comprises, as shown in FIG. 3, a main molding body 100 having a hole 101 therein which penetrates to the vehicle compartment and a frame 102 which is inserted into the penetrating hole 101 and has a louver for preventing invasion of water or the like. In the above described side molding, the frame 102 acts as a garnish.

As a method of connecting the garnish to the main molding body, there is known that the garnish is bonded to the main molding body with an adhesive therebetween.

Furthermore, there is known that the garnish 102 which is made of a thermoplastic resin is provided with legs 103, the legs 103 are inserted into the penetrating hole 101, and the legs 3 are subjected to welding at their front ends by thermal caulking or the like so that the garnish is integrally secured to the main body.

The garnish is generally made of a hard resin such as ABS, acrylic resin on the like. Therefore, the garnish can be broken more easily than the main molding body if subjected to any impact. However, since the garnish is integrally formed with the main molding body, it is difficult to replace only a broken garnish with a new one. As a result, the whole molding body is required to be changed, even though only the garnish is broken. Therefore, many manufacturing processes are needed, and hence costs become high.

SUMMARY OF THE INVENTION

An object of the present invention is therefore to provide a molding in which the garnish alone can be replaced.

Therefore, molding according to the present invention comprises: a main molding body formed in an elongated plate-like shape made of soft resin and having a fitting hole passing therethrough in the direction of the thickness thereof; a retainer which is inserted into the fitting hole from a reverse side of the main molding body; and a part made of hard resin inserted into the fitting hole from an obverse side of the main molding body, wherein the part is mechanically secured to the retainer to thereby allow the part to be fixedly secured to the main molding body.

The main molding body is formed of a soft resin such as vinyl chloride resin, polyurethane or the like, and it has a fitting hole which passes through the main molding body in the direction of the thickness thereof. The main molding body is generally formed by way of injection molding.

The retainer is provided for the purpose of holding the fitted part, i.e., garnish with mechanically connecting the garnish thereto. The retainer can be made of metal, hard resin or the like. It is preferable that the retainer maintains its shape even if subjected to any impact, and therefore, the retainer is preferably made of a material having superior strength such as metal or fiber reinforced resin.

As the fitted part (garnish), a decorative part representing a pattern or characters, a frame for an air outlet aperture or the like, a flasher lens or the like may be secured to the main molding body. The fitted part is made of hard resin such as ABS resin, acrylic resin or the like. A shape, degree of hardness or the like of the fitted part may be selectively determined according to various requirements.

The major characteristic of this invention resides in that the garnish is mechanically connected to the retainer to thereby allow the garnish to be fixedly secured to the main molding body. Various connecting manners can be employed as the method for realizing this mechanical connecting. It should preferably take the form of a fitting which enables the part to be easily secured to but not easily detached from the retainer. For example, a manner in which the retainer and the garnish each have securing hooks and the securing hooks are engaged with each other or a manner in which a clip formed on either one of the retainer and the garnish is fitted in a hole formed in the other can be employed.

The fitted part preferably has a first seating surface which abuts against an obverse side of the main molding body, while the retainer preferably has a second seating surface which abuts against a reverse side of the main molding body so that the main molding body is held and compressed by the fitted part and the retainer between the first seating surface and the second seating surface. According to such a structure, the main molding body is compressed and elastically deformed, as a result of which, due to elastic reaction force by the molding body, the garnish and the retainer are urged in the respective directions in which they move away from each other. The urging force is received by a portion connecting the garnish and the retainer. Therefore, the garnish and the retainer are firmly secured to the main molding body. Consequently, vibration of the garnish and the retainer or the separation of one from the other is certainly prevented from occurring during the operation of the vehicle.

The retainer may be secured to the main molding body by means of an adhesive or the like. Or, it may be possible that the retainer be simply inserted into the fitting hole, since the reverse side of the main molding body abuts against the surface of the car body panel, and the retainer is fixedly held between the main molding body and the car body panel.

In the molding according to the present invention, the garnish is inserted into the fitting hole in the main molding body, and is mechanically connected to the retainer. As a result, the garnish is fixedly secured to the main molding body. Therefore, if the garnish is broken due to any impact, the garnish alone can be removed from the retainer, with maintaining the main molding body and the retainer in their positions. Thus, the garnish alone can be replaced.

In the molding according to the present invention, if the garnish is broken due to impact or the like, since the main molding body and the retainer do not need to be replaced, it is a very simple task to replace only the garnish with a new one. Furthermore, heat caulking or adhesion becomes unnecessary, and therefore, the number of manufacturing processes can be reduced. As a result, the costs involved in manufacture and replacement of parts can be reduced.

BRIEF DESCRIPTION OF THE DRAWINGS

FIGS. 1 and 2 illustrate a side molding according to an embodiment of the present invention, wherein FIG. 1 is a perspective view of the side molding;

FIG. 2 is a cross-sectional view taken along the line II—II of FIG. 1; and

DETAILED DESCRIPTION OF THE PREFERRED EMBODIMENTS

Referring to the accompanying drawings, an embodiment of the present invention will be specifically described.

Figure 1:
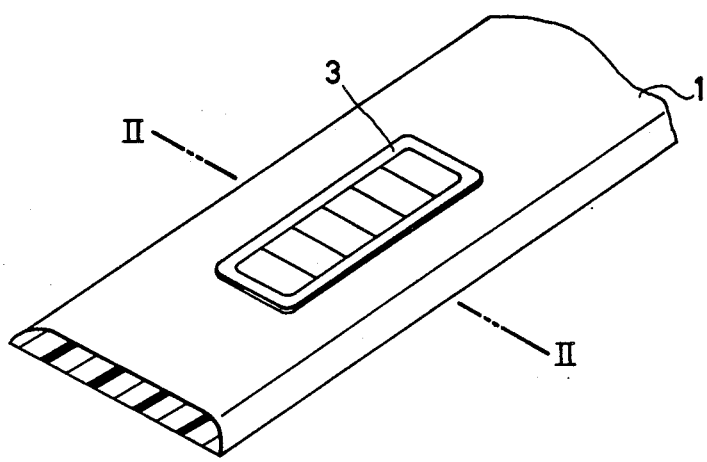
Figure 2:
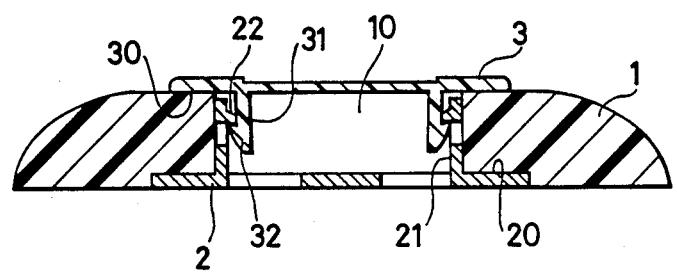
Figure 3:
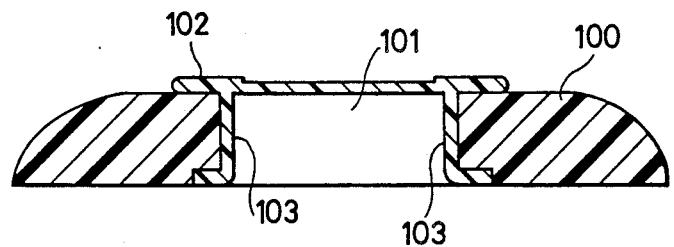
FIG. 3 is a cross-sectional view of a conventional side molding corresponding to the state shown in FIG. 2.

As shown in FIGS. 1 and 2, a side molding according to the present invention has a fitting hole 10 which passes through the side molding in the direction of the thickness thereof. The side molding comprises a main molding body 1 which is made of vinyl chloride resin by way of injection molding, and which is formed in an elongated plate-like shape. The side molding further comprises a retainer 2 which is inserted into the fitting hole 10 from a reverse side of the main molding body 1, and a garnish 3 which is inserted into the fitting hole 10 from an obverse side of the main molding body 1 so that the garnish 3 is mechanically secured by the retainer 2. The garnish 3 acts as a frame for an air outlet aperture.

The retainer 2 has an outer shape larger than that of the fitting hole 10 and has a second seating surface 20 which abuts against the main molding body 1. The retainer 2 has a plurality of securing portions 21 which stand erect perpendicularly from the second seating surfaces 20. A securing hook 22 is formed on each securing portion 21. The retainer 2 is formed, by cutting a steel plate and bending the cut portion upwardly so as to form the securing portions 21 and the securing hooks 22.

The garnish 3 is formed of ABS resin by injection molding. The outer shape of this garnish 3 is arranged to be larger than that of the fitting hole 10, and has a first seating surface 30 which abuts against the main molding body 1. The garnish 3 has a plurality of legs 31 which extend toward the reverse side of the main molding body 1, and a hook 32 is formed on each leg 31.

The garnish 3 and the retainer 2 are, as shown in FIG. 2, fixed to the main molding body 1 by way of connecting the securing hooks 22 to the hooks 32. The first seating surface 30 and the second seating surface 20 are brought into abutment with the main molding body 1, whereby the main molding body 1 is held between the first seating surface 30 and the second seating surface 20.

A method of assembling the above-described side molding will now be described.

First, the retainer 2 is inserted into the fitting hole 10 of the main molding body 1 from the reverse side of the main molding body 1. Then, the garnish 3 is inserted into the fitting hole 10 from the obverse side of the main molding body 1. As the garnish 3 is inserted into the fitting hole 10, the legs 31 advance with the shape thereof deformed inwardly, with the hooks 32 abutting tightly against the securing hooks 22. When the hooks 32 are separated from the corresponding securing hooks 22, the legs 31 are returned due to the elastic force of the legs 31 so that the hooks 32 become secured to the securing hooks 22. As a result, the garnish 3 is secured and held at the securing portions 21 of the retainer 2. The width of the space defined by the first seating surface 30 and the second seating surface 20 is slightly smaller than the thickness of the main molding body 1. Therefore, the main molding body 1 is held and compressed between the first seating surface 30 and the second seating surface 20. On the other hand, the garnish 3 and the retainer 2 are urged in the respective directions in which they move away from each other due to the resilient reaction force by the main molding body 1. The urging force is received by the portion connecting the securing hooks 22 and the hooks 32 to each other. As a result, the garnish 3 and the retainer 2 are firmly secured to the main molding body 1.

In this state, the garnish 3 cannot be removed from the retainer 2 because the hooks 32 are fixedly connected to the securing hooks 22. However, if the garnish 3 is broken due to an impact of some kind, the hooks 32 can be easily separated from the securing hooks 22, through cutting the garnish 3 in the portion between the legs 31 to separate the legs 31 from one another. Consequently, only the garnish 3 can be separated from the retainer 2, with the retainer 2 and the main molding body 1 being retained on the car body panel with their shape maintained. When a new garnish 3 is inserted into the fitting hole 10, its hooks 32 can be secured to the securing hooks 22, whereby replacement of the garnish 3 can be conducted easily.

Although the garnish and the retainer are connected to each other with an undercut securing manner in the above-described embodiment, this invention is not limited to the above embodiment. A structure may be employed in which either the garnish or the retainer is provided with a hole and a clip formed on the other is secured in this hole. Alternatively, the connection may be realized by screw fixing. Furthermore, the retainer may be secured to the main molding body 1 by means of an adhesive or the like.

What is claimed is:

1. A molding, comprising:

a main molding body made of soft resin and formed in an elongated plate-like shape, said main body molding having a fitting hole passing therethrough in the direction of the thickness thereof;

a retainer means inserted into said fitting hole from a reverse side of the main molding body; and a fitting part means made of hard resin and inserted into said fitting hole from an obverse side of said main molding body, said fitting part means being mechanically connected to said retainer means to thereby allow said fitting part means to be secured to said main molding body;

said fitting means having a first seating surface which abuts against the obverse side of said main molding body, said retainer means having a second seating surface which abuts against the reverse side of said main molding body, a width of a space defined between said first seating surface and said second seating surface being slightly smaller than a thickness of said main molding body.

2. A molding according to claim 1, wherein said fitting part means has a plurality of legs extending toward the reverse side of said main molding body, each of said legs having, at a front end thereof, an outwardly extending hook, and said retainer means having a plurality of securing portions standing erect perpendicularly from said second seating surface, each of said securing portions having an inwardly extending securing hook.

3. A molding according to claim 2, wherein said fitting part means is a garnish made of ABS resin, said first seating surface, said legs and said hooks being formed integrally with said garnish; and said retainer means, said securing portions and said securing hooks being formed through press processing from a sheet metal.

4. A molding, comprising:
   a main molding body having a fitting hole passing therethrough in the direction of the thickness of said main molding body from a first side to a second side thereof;
   a retainer means inserted into said fitting hole from the second side of the main molding body; and
   a fitting part means inserted into said fitting hole from the first side of said main molding body, said fitting part means being mechanically connected to said retainer means to thereby allow said fitting part means to be secured to said main molding body;
   said fitting part means having a first seating surface which abuts against the first side of said main molding body, said retainer means having a second seating surface which abuts against the second side of said main molding body, a width of a space defined between said first seating surface and said second seating surface being slightly smaller than a thickness of said main molding body.

5. A molding according to claim 4, wherein said fitting part means has a leg extending from the first seating surface in a direction toward the second side of said main molding body, said leg having an outwardly extending hook; and said retainer means has a securing portion extending from the second seating surface in a direction toward the first side, said securing portion having an inwardly extending securing hook, said hook of the leg of said fitting part means being connected with the securing hook of the securing portion of said retainer means.

* * * * *